United States Patent [19]

Massingill, Jr.

[11] Patent Number: 5,086,094

[45] Date of Patent: Feb. 4, 1992

[54] ORGANIC SOLVENT SOLUTIONS OF PHOSPHATE ESTERS OF EPOXY RESINS

[75] Inventor: John L. Massingill, Jr., Lake Jackson, Tex.

[73] Assignee: The Dow Chemical Company, Midland, Mich.

[21] Appl. No.: 530,126

[22] Filed: May 29, 1990

Related U.S. Application Data

[63] Continuation-in-part of Ser. No. 241,517, Sep. 7, 1988, abandoned.

[51] Int. Cl.$^5$ ............................................. C08G 59/50
[52] U.S. Cl. .................... 523/414; 528/103; 528/104; 528/108; 525/481; 525/488; 525/523; 525/510
[58] Field of Search ............... 523/414; 528/103, 104, 528/108; 525/481, 488, 523, 510

[56] References Cited

U.S. PATENT DOCUMENTS

| | | |
|---|---|---|
| 2,541,027 | 2/1951 | Bradley . |
| 3,860,561 | 1/1975 | Vargiu et al. .................. 260/38 |
| 4,102,866 | 7/1978 | Speranza et al. ............... 528/135 |
| 4,259,472 | 3/1981 | Chattha et al. ................ 528/72 |
| 4,284,754 | 8/1981 | Chattha et al. ................ 528/107 |
| 4,820,784 | 4/1989 | Massingill et al. ............. 525/481 |

FOREIGN PATENT DOCUMENTS

| | | |
|---|---|---|
| 1148077 | 5/1963 | Fed. Rep. of Germany . |
| 1240463 | 7/1960 | France . |
| 296514 | 9/1928 | United Kingdom . |

OTHER PUBLICATIONS

Chemical Abstract, vol. 72, No. 26, Jun. 29, 1970, p. 28, Abstract No. 13350n.

*Primary Examiner*—Paul R. Michl
*Assistant Examiner*—Christophers P. Rogers

[57] ABSTRACT

Nonaqueous organic solvent solutions of phosphate esters of epoxy resins. Coating compositions containing these compositions have improved thermal properties as compared to like compositions which are dispersed in water.

32 Claims, No Drawings

ORGANIC SOLVENT SOLUTIONS OF PHOSPHATE ESTERS OF EPOXY RESINS

CROSS-REFERENCE TO RELATED APPLICATION

This application is a continuation-in-part of application Ser. No. 07/241,517 filed Sept. 7, 1988, now abandoned.

FIELD OF THE INVENTION

The present pertains to organic solution of phosphate esters of epoxy resins.

BACKGROUND OF THE INVENTION

Advanced aromatic epoxy resins are well known for their extremely useful combination of properties such as, for example, flexibility, adhesion, resistance to corrosion, chemical and solvent resistance, and the like. Unfortunately, they also have some well known disadvantages such as, for example, sensitivity to ultraviolet light, relatively high viscosities, limited formability, and the like.

Epoxy phosphate esters have been prepared by various processes for water thinnable coating formulations. It has been unexpectedly discovered that these phosphate esters, when employed in non-aqueous formulations, give outstanding barrier properties to the resulting coatings when compared to the base resins from which they are derived. Epoxy resin phosphate esters and methylol containing curing agents can be formulated to give bake coatings with exceptional improvements in flexibility, adhesion and formability with retention of traditional epoxy protection.

SUMMARY OF THE INVENTION

The present invention pertains to a curable composition which is (a) essentially water free and (b) polymer of ethylenically unsaturated monomer free; which comprises a mixture of
(A) a product which is free of methylol or alkoxymethyl substituent groups resulting from reacting
  (1) at least one compound containing an average of more than one vicinal epoxide group per molecule; with
  (2) at least one member selected from the group consisting of
    (a) phosphoric acid;
    (b) super phosphoric acid; and
    (c) a combination of (a) and (b); and
  (3) optionally water;
  wherein component (2) is employed in an amount which provides a ratio of moles of component (2) to component (1) of from about 0.02:1 to about 5:1; and component (3) is employed in an amount which provides a ratio of moles of component (3) to moles of component (1) of from zero:1 to an amount sufficient to totally hydrolyze all of the epoxide groups in component (1), said amount of water including any amount of water contained in component (2) and subsequently removing any residual quantities of water remaining after any hydrolysis of the epoxide-containing compound of component (1); and
(B) at least one organic solvent for component (A); and wherein component (A) is employed in an amount of from about 100 to about 10 percent by weight based upon the combined weight of components (A) and (B); and component (B) is employed in an amount of from about 0 to about 90 percent by weight based upon the combined weight of components (A) and (B); and
(C) a curing quantity of at least one curing agent for component (A) which curing agent cures through the aliphatic hydroxyl groups contained in the phosphorylated and optionally totally or partially hydrolyzed epoxy resin.

DETAILED DESCRIPTION OF THE INVENTION

The phosphate ester compositions of the present invention are prepared by any suitable means as described by Martin in U.S. Pat. No. 4,289,812, by Martin in U.S. Pat. No. 4,164,487, by Martin et al. in U.S. Pat. No. 4,256,844 or by Langer et al. in U.S. Pat. No. 4,613,661, all of which are incorporated herein by reference in their entirety.

Suitably, the epoxy phosphate ester can be prepared by reacting an epoxy resin having an average of more than one vicinal epoxy group per molecule with a phosphoric acid source at a temperature suitably from about 50° C. to about 250° C., more suitably from about 100° C. to about 200° C., most suitably from about 110° C. to about 180° C.: at pressures suitably from about 0 psia to about psia, more suitably from about 0 psia to about 150 psia, most suitably from about 0 psia to about 100 psia for a period of time suitably from about 0.2 to about 10, more suitably from about 0.5 to about 6, most suitably from about 1 to about 3, hours. Higher reaction temperatures, require shorter reaction times to complete the reaction whereas lower temperatures require longer reaction times to complete the reaction. The reactants are employed in quantities which provide a molar ratio of phosphorus-containing compound to epoxy-containing containing compound suitably from about 0.02:1 to about 5:1, more suitably from about 0.2:1 to about 2:1, most suitably from about 0.5:1 to about 1:1.

If desired, the epoxy groups, if any remain after reaction with the phosphorus-containing compound, can be totally or partially hydrolyzed by reaction with water. The hydrolysis reaction can be conducted in the manner described by Davis et al. in U.S. Pat. No. 4,340,713, and by Cavitt in U.S. Pat. No. 4,404,335 both of which are incorporated herein by reference in their entirety. The water can be employed in an amount corresponding suitably to a ratio of moles of water per mole of epoxy resin employed of from about zero:1 to about 100:1, more suitably from about 0:1 to about 50:1, most preferably from about 0:1 to about 2:1.

Suitable phosphoric acid sources include, for example, phosphoric acid, super phosphoric acid, other condensed forms of phosphoric acid, aqueous solutions containing at least 18% $H_3PO_4$, and phosphoric esters, combinations thereof and the like.

Suitable epoxy resins which can be employed to prepare the phosphate esters thereof include any epoxy resin having an average of more than one vicinal epoxy group per molecule. These include, aliphatic, cycloaliphatic, or aromatic based epoxy resins. Suitable such epoxy resins include, for example but not to be limited to, those resins represented by the following formulas I, 11, III, IV or V

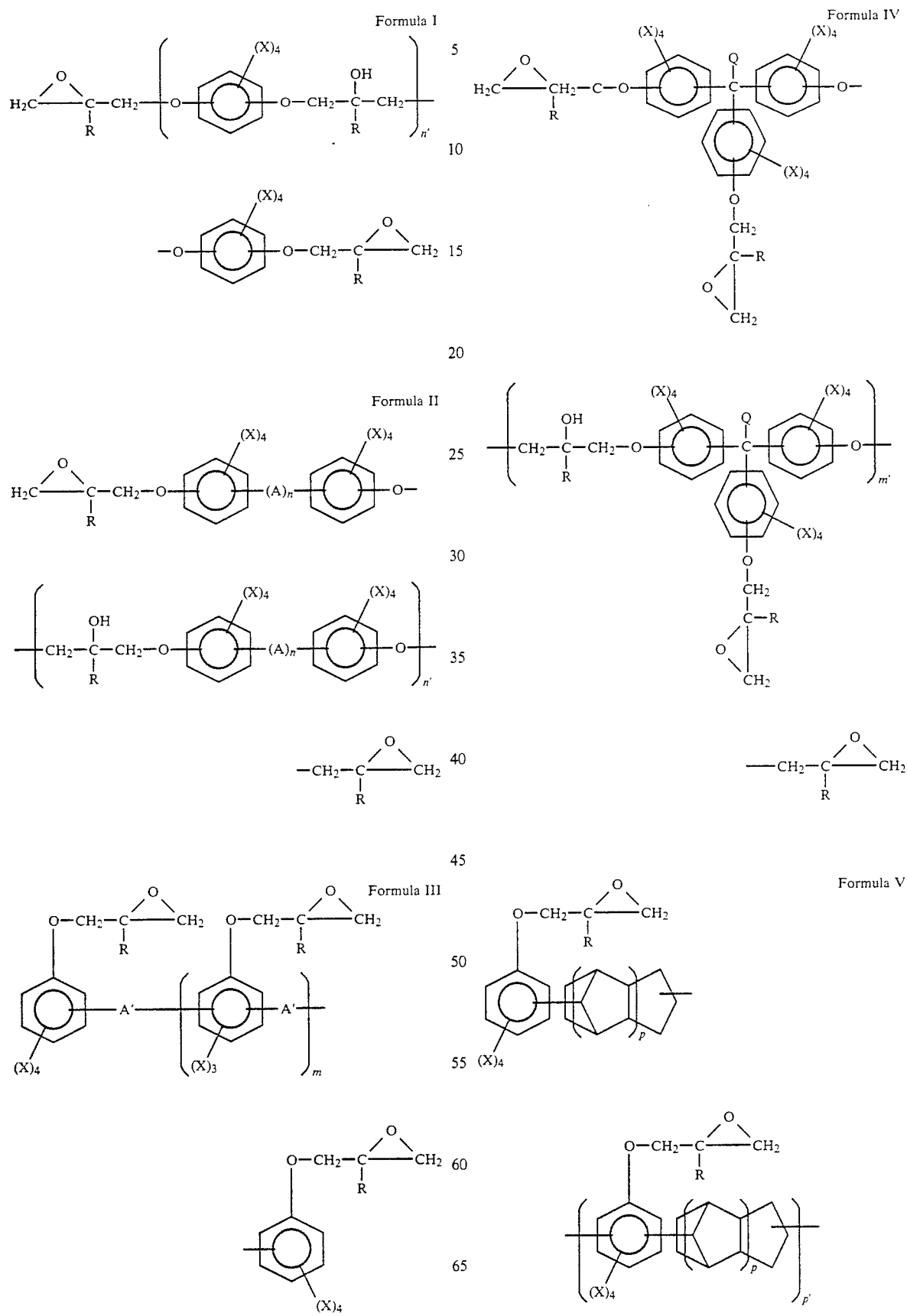

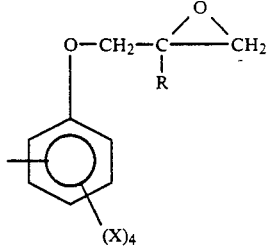

wherein each A is independently a divalent hydrocarbyl group having suitably from 1 to about 12, more suitably from 1 to about 6, most suitably from 1 to about 4, carbon atoms; each A' is independently a divalent hydrocarbyl group having from 1 to about 10, more suitably from 1 to about 4, most suitably from 1 to about 2, carbon atoms; each Q is independently hydrogen or an alkyl group having from 1 to about 4 carbon atoms; each R is independently hydrogen or an alkyl group having from 1 to about 3 carbon atoms; each X is independently hydrogen, a hydrocarbyl or hydrocarbyloxy group having suitably from 1 to about 12, more suitably from 1 to about 6, most suitably from 1 to about 4, carbon atoms or a halogen atom, preferably chlorine or bromine: m has a value suitably from about 0.01 to about 8, more suitably from about 1 to about 6, most suitably from about 2 to about 4: n has a value of zero or 1; n' has an average value suitably from about 0 to about 200, more suitably from about 0 to about 150, most suitably from about 0 to about 100; each p suitably has a value from zero to about 10, more suitably from about 0 to about 8, most suitably from about 0 to about 6; and each p' suitably has a value from zero to about 8, more suitably from about 1 to about 6, most suitably from about 2 to about 4.

The epoxy resins which are employed to prepare the phosphorylated and optionally fully or partially hydrolyzed epoxy resins of the present invention suitably have epoxide equivalent weights (EEWs) of from about 90 to about 100,000, more suitably from about 170 to about 50,000, most suitably from about 400 to about 10,000.

Suitable organic solvents which can be employed herein include, for example, alcohols, glycols, glycol ethers, ketones, aromatic hydrocarbons, cyclic ethers, esters, chlorinated solvents, combinations thereof and the like. Particularly suitable solvents include, for example, toluene, benzene, xylene, methyl ethyl ketone, methyl isobutyl ketone, diethylene glycol methyl ether, dipropylene glycol methyl ether, ethylene glycol hexyl ether, mixtures of acetone and methylene chloride, mixtures of alcohols and methylene chloride, any combination thereof and the like.

The amount of solvent to be employed is practically any amount which provides the system with the desired viscosity. However, suitably such amounts include, for example, from about 0 to about 90, more suitably from about 10 to about 80, most suitably from about 20 to about 80, parts by weight based upon the weight of resin.

The phosphorylated and, if desired, totally or partially hydrolyzed epoxy resins of the present invention can be cured by the use of curing agents which cure through the aliphatic hydroxyl groups contained in the phosphorylated and optionally totally or partially hydrolyzed epoxy resin. Suitable such curing agents include, for example, alkylolated urea-aldehyde resins, alkylolated melamine-aldehyde epoxy resins, polyisocyanates, blocked polyisocyanates, alkylolated phenol-aldehyde resins, combinations thereof and the like. Particularly suitable curing agents include, for example, methylolated urea-formaldehyde resins, methylolated melamine-formaldehyde resins, methylolated phenol-formaldehyde resins, toluene diisocyanate, 4,4'-diphenylmethanediisocyanate, isophorone diisocyanate and its liquid derivatives sold under the tradenames of Rubinate LF-168 or Rubinate LF-179 by Rubinate Chemicals, Inc. of Wilmington, Del., or ISONATE ™ 143L or ISONATE ™ 181 by The Dow Chemical Company of Midland, Mich., a biuret or isocyanurate from hexamethylene diisocyanate, and a cyclic trimer of hexamethylene diisocyanate and toluene diisocyanate. The isocyanates can also be prepolymers of the aforementioned isocyanates and polyols such as polypropylene glycols, triols such as trimethylolpropane or glycerine or their reaction products with propylene oxide, butylene oxide or mixtures thereof having equivalent weights of from about 85 to about 1000. The isocyanates can be blocked with phenols, such as phenol, 4-chlorophenol, o-secbutylphenol, lactams such as caprolactam and ketoximes or aldoximes such as acetaldehyde oxime or methyl ethyl ketoxime, any combination thereof and the like. Coatings capable of being cured at room temperature can be obtained by use of the aforementioned isocyanates which contain no blocking agent. From an industrial standpoint, the blocked isocyanates are preferred since they will provide one package systems. The ketoxime or lactam blocked isocyanates are preferred from an ecology standpoint and for providing the appropriate cure temperatures.

The curing agents are employed in any quantity which will effectively cure the phosphorylated and optionally, totally or partially hydrolyzed epoxy resin. Suitable such effective amounts will depend upon the particular epoxy resin being cured and the particular curing agent being employed; however, suitable such amounts can include, for example from 1 to about 90, more suitably from about 4 to about 50, most suitably from about 4 to about 30, percent by weight based upon the weight of the resin.

The compositions of the present invention can be blended with other materials such as, fillers, pigments, dyes, flow modifiers, thickeners, reinforcing agents, catalysts, combinations thereof and the like.

These additives are added in functionally equivalent amounts e.g., the pigments and/or dyes are added in quantities which will provide the composition with the desired color; however, they are suitably employed in amounts of from about 20 to about 200, more suitably from about 50 to about 150, most suitably from about 50 to about 100 percent by weight based upon the weight of the resin and curing agent.

The modifiers such as thickeners, flow modifiers and the like can be suitably employed in amounts of from about 0.01 to about 20, more suitably from about 0.1 to about 10, most suitably from about 0.1 to about 2 percent by weight based upon the weight of resin and curing agent.

Reinforcing materials which can be employed herein include natural and synthetic fibers in the form of woven, mat, monofilament, multifilament, and the like. Suitable reinforcing materials include, glass, ceramics, nylon, rayon, cotton, aramid, graphite, combinations thereof and the like.

Suitable fillers which can be employed herein include, for example, inorganic oxides, ceramic microspheres, plastic microspheres, combinations thereof and the like.

The fillers can be employed in amounts suitably from about 5 to about 100, more suitably from about 10 to about 50, most suitably from about 10 to about 30 percent by weight based upon the weight of the resin and curing agent.

The following examples are illustrative of the invention and are not to be construed as to limiting the scope thereof in any manner.

EXAMPLE 1

Phosphorylation of Advanced Epoxy Resin, EEW 1675, with Approximately 1 phr $H_3PO_4$ (as 110% acid) in Ethylene Glycol Monobutyl Ether (70% Solids)

An advanced bisphenol A based epoxy resin having an epoxide equivalent weight (EEW) of 1675 available from The Dow Chemical Company as D.E.R. ™ 667, (500 grams, 0.15 mole) and solvent, ethylene glycol (500 grams. monobutyl ether-(193 grams, 1.63 moles), are placed in a 2-liter round bottom, 5-neck pyrex flask equipped with a mechanical stirrer, temperature controller, nitrogen pad, condenser and addition funnel. The resin is stirred slowly as the temperature is raised to 125° C. to dissolve the resin. When the resin is dissolved, super phosphoric acid (5 grams, 0.054 mole), in 21 grams solvent is added to the resin solution and allowed to react for 30 minutes. Water (10 grams, 0.56 mole) is added and the mixture stirred for two hours to give the epoxy resin phosphate ester solid solution (70% solids).

The above resin is formulated with various levels of a phenol/formaldehyde resole curing agent available from BTL Specialty Resins Corp. as METHYLON ™ 75108 (a mixture of the allyl ethers of mono-, di-, and tri-methylol phenols). to give formulations with 10%, 20% and 30% crosslinker. The solvent used to reduce to application viscosity is DuPont Dibasic ester.

The above formulations are coated onto tin free steel can stock using a drawdown bar. The tin free steel panels have a monolayer of chromium oxide on the surface. Prior to coating, the panels are washed with Aromatic 100 solvent from Exxon to remove oil and dirt particles followed by drying in an oven at 400° F. for 2 minutes. The coatings are cured by baking in an electric convection oven at 400° F. for 8, 10 or 15 minutes. The following tests are performed on the cured panels and the results are given in Table 1.

METHYL ETHYL KETONE (MEK) RESISTANCE is determined by rubbing the coating surface with a 2 pound ball-peen hammer that has cheese cloth (10 plies) wrapped around the ball. The cheese cloth is saturated with MEK. No force other than the natural weight of the hammer and the force needed to guide the hammer back and forth across the coating is applied. One back and forth movement constitutes one double rub. Counting is stopped when the coating is scratched or marred.

WEDGEBEND FLEXIBILITY is determined according to ASTM D 3281-84 modified by using an 8X jewelers lighted magnifying glass to read the test panels. The results are recorded as millimeters of failure from the TO end of the panel.

IMPACT RESISTANCE is performed at 20 inch-pounds (usually just short of rupturing the TFS) according to ASTM D-2794-84. The panel is tested for adhesion by taping it with Scotch 610 tape and removing the tape in a quick smooth motion. Adhesion failure or cracking of the coating are visualized by acidic copper sulfate and the test panels read under an 8X jewelers lighted magnifying glass. The panels are rated as follows: 0=no failure, 1=failure.

STEAM PROCESS RESISTANCE is determined by placing the test panels in a steam autoclave for 90 minutes at 250° F. at a pressure of about 15 psig (103.4 kPa). The test panels are stressed with a simple U-shaped form prior to being placed in the autoclave. The test panels are removed from the autoclave, immediately (within 15 minutes) dried and inspected for blush. The ratings are $\geqq$ zero for no blush and 1 for a slight haziness and 2 for a milky white appearance. The stressed area of the panel is cut with a razor blade in an X pattern. Scotch brand #610 adhesive tape is rubbed over the X and removed in a smooth, rapid motion. The adhesion ratings are 0 for no loss, 1 for slight ticking, 2 for a loss of 5% of the coating, 3 for a 10% loss of the coating and 4 for a gross failure, at least a loss of $\geqq$ 20% of the coating. Results of this test are reported under the heading Autoclave.

FILM THICKNESS is determined by using a Fischer Multiscope. This tester determines film thickness by using magnetic properties of the steel substrate calibrated against a standard on the bare (film free) substrate. Each panel has an average of fifteen measurements to determine the thickness of the panel. The range for acceptable coating thickness is approximately 0.13 to 0.35 mils (0.003302 to 0.00889 mm).

CROSS-HATCH ADHESION is performed according to ASTM test method D-3359 using a Gardco Model P-A-T paint adhesion test kit. The failures are rated as follows: 5B=no failure, edges of the cuts are completely smooth; 4B=small flakes of coat; 3B=small flakes of the coating are detached along the edges and at the intersections of the cuts, the area affected is 5-15% of the lattice; 2B=the coating has flaked along the edges and on parts of the squares, the area affected is 15-35%; 1B=the coating has flaked along the edges of cuts in large ribbons and whole squares have detached, the area affected is 35-65% of the lattice; 0B=flaking and detachment worse than grade 1.

T-PEEL ADHESION is measured by a T-peel test reported by P. S. Sheih and J. L. Massingill in *The Journal of Coatings Technology*, 62(781), 25-30 (1990) using an Instron. The T-peel test strips (FIG. 6) are prepared by first cutting the cured panels into 5 mm wide strips. Then a strip of thermoplastic adhesive is placed between two panel strips with the coatings facing the adhesive. Each unit is then heat bonded under a pressure of 150 psig at a temperature of 210° C. for 15 seconds. The panels are then tested for dry adhesion using the Instron for a T-peel test. Peeling speed is 200 mm/min. The results are recorded as highest energy to separate in kilograms per 5 millimeter cross-sectional area. Wet adhesion is measured in the same manner after the testing specimen is soaked in 90° C. water for four days. Location of the adhesion failure is noted for each test. Failure is generally at the coating-metal interface, not at the coating-thermoplastic adhesive interface, except for some of the coatings with low levels of curing agent.

FREE FILM ELONGATION is determined by modification of a procedure discussed by G. G. Schurr in Paint Testing Manual, *ASTM Special Technical Publi-* cation 500, pp. 338-340 (1972). Films for elongation and tensile strength determination are prepared by drawdown with a number 52 wire wound rod on glass plates that have been treated with Surfynol 104. The coatings are baked at 400° F. for 10 minutes. The dry film thickness of the resulting coating are 1.0±0.2 mils. The coating is cut into 1 inch wide strips and an attempt to start a peel is made using a razor blade. The panel and coating are then submerged in room temperature water for 15 minutes to 3 hours. The strips of coating are then gently pulled off of the glass. The strips are dried and the film thickness determined. Test strips with dimensions of 0.5×2 inches are then prepared using a JDC Precision Sample Cutter. Paper with weak adhesive on one side is placed on both sides of both ends of the test strips, leaving 3 cm of film between the paper. The samples are then placed in an Instron equipped with a 5 Kg load cell and tested at 2 mm/min. The energy to pull the sample apart is measured as is the distance between sample holders at failure. Percent elongation and tensile strength are then calculated. Measurements are repeated for 10 samples. The top five values are used to determine the values reported.

Preparation of free films from coatings on glass gives a practical demonstration of the difference in adhesion---the phosphate ester coatings can not be detached from the glass substrate when dry and requires longer water exposure to effect easy removal.

COMPARATIVE EXPERIMENT A

A solid bisphenol A based epoxy resin prepared by advancing the diglycidyl ether of bisphenol A with bisphenol A having an EEW of 1675, a Durran's softening point of 115°-130° C., and a Gardner-Holdt viscosity at 40% by wt. in Dowanol DB glycol ether solvent of Y-$Z_1$ available from The Dow Chemical Company as D.E.R ™ 667 (40 grams) is mixed with solvent (ethylene glycol monobutyl ether, 50 grams) along with phosphoric acid (as 85% aqueous solution, 0.6 gram, 1% by weight of resin solids) and mixed overnight on a roller at about 35° C. until dissolved. Then a phenol/formaldehyde resole curing agent available from BTL Specialty Resins Corp. as METHYLON ™ 75108, 10 grams, 20% by weight of resin solids and a silicone flow modifier available from The General Electric Co. as SR882, 0.2 gram, are added. This formulation is mixed by rolling for one hour. Test panels are coated, baked at 400° F. for either 8, 10 or 15 minutes and tested as in Example 1. The results are given in Table 1. The amount of curing agent used is adjusted to also give formulations containing 10% and 30% by weight. These formulations are coated onto test panels, baked, and tested as described above. The results are given in Table I.

TABLE I

| SAMPLE NO. | RESIN | % X-LINKER BTL 75108 | DRY FILM THICK. MILS | BAKE TIME (min.) | MEK DR | WEDGEBEND LOSS, mm | AUTOCLAVE BLUSH | AUTOCLAVE ADHESION | 20 INCH-LB REVERSE IMPACT |
|---|---|---|---|---|---|---|---|---|---|
| 1* | C.E. A | 10 | 0.29 | 8 | 60 | 21 | 0 | 0 | 1 |
| 2* | C.E. A | 10 | 0.23 | 10 | 50 | 34 | 0 | 0 | 0 |
| 3* | C.E. A | 10 | 0.19 | 15 | 30 | 21 | 0 | 0 | 1 |
| 4* | C.E. A | 20 | 0.35 | 8 | 210 | 45 | 0 | 1 | 0 |
| 5* | C.E. A | 20 | 0.21 | 10 | 220 | 75 | 0 | 1 | 1 |
| 6* | C.E. A | 20 | 0.20 | 15 | 250 | 77 | 0 | 0 | 0 |
| 7* | C.E. A | 30 | 0.25 | 8 | 400 | 80 | 0 | 1 | 1 |
| 8* | C.E. A | 30 | 0.31 | 10 | 500 | 45 | 0 | 0 | 1 |
| 9* | C.E. A | 30 | 0.19 | 15 | 500 | 47 | 0 | 0 | 1 |
| 10 | Ex. 1 | 10 | 0.13 | 8 | 10 | 24 | 0 | 0 | 1 |
| 11 | Ex. 1 | 10 | 0.15 | 10 | 10 | 21 | 0 | 1 | 1 |
| 12 | Ex. 1 | 10 | 0.22 | 15 | 10 | 30 | 0 | 0 | 0 |
| 13 | Ex. 1 | 20 | 0.16 | 8 | 70 | 30 | 0 | 0 | 1 |
| 14 | Ex. 1 | 20 | 0.17 | 10 | 40 | 29 | 0 | 1 | 1 |
| 15 | Ex. 1 | 20 | 0.21 | 15 | 90 | 28 | 0 | 0 | 0 |
| 16 | Ex. 1 | 30 | 0.18 | 8 | 70 | 39 | 0 | 1 | 0 |
| 17 | Ex. 1 | 30 | 0.23 | 10 | 120 | 43 | 0 | 1 | 1 |
| 18 | Ex. 1 | 30 | 0.18 | 15 | 130 | 31 | 0 | 1 | 1 |

*Not an example of the invention.

| Sample No. | Resin | X-Hatch Adhesion | T-Peel Adhesion Dry | T-Peel Adhesion Wet | % Elong. |
|---|---|---|---|---|---|
| 5* | C.E.A | 4 | 0.1 | 0.1 | 3.4 |
| 14 | Ex. 1 | 5 | 5.5 | 0.6 | 5.39 |

*Not an example of the present invention.

EXAMPLE 2

Phosphorylation of Advanced Epoxy Resin, EEW 3000, with 0.82 phr $H_3PO_4$ (as 110% acid) in Ethylene Glycol Monobutyl Ether (50% Solids)

A solid bisphenol A based epoxy resin having an EEW of 3000 available from The Dow Chemical Company as D.E.R. ™ 669E is phosphorylated by the procedure of Example 1. Coatings are prepared and tested as described in Example 1. The results are given in Table II.

COMPARATIVE EXPERIMENT B

The procedure of Comparative Experiment A is used to formulate, coat and test a composition with the solid epoxy resin having an EEW of 3000 rather than the resin having an EEW of 1675. The results are given in Table II.

TABLE II

| SAMPLE NO. | RESIN | % X-LINKER BTL 75108 | DRY FILM THICK. MILS | BAKE TIME | MEK DR | WEDGEBEND LOSS, mm | AUTOCLAVE BLUSH | AUTOCLAVE ADHESION | 20 INCH-LB REVERSE IMPACT |
|---|---|---|---|---|---|---|---|---|---|
| 19 | C.E. B* | 10 | 0.22 | 8 | 40 | 41 | 0 | 1 | 1 |
| 20 | C.E. B* | 10 | 0.30 | 10 | 43 | 49 | 0 | 0 | 1 |
| 21 | C.E. B* | 10 | 0.37 | 15 | 50 | 35 | 0 | 0 | 0 |
| 22 | C.E. B* | 20 | 0.28 | 8 | 26 | 47 | 0 | 0 | 1 |
| 23 | C.E. B* | 20 | 0.18 | 10 | 60 | 42 | 0 | 1 | 1 |
| 24 | C.E. B* | 20 | 0.19 | 15 | 60 | 55 | 0 | 0 | 1 |
| 25 | C.E. B* | 30 | 0.15 | 8 | 250 | 80 | 0 | 0 | 1 |
| 26 | C.E. B* | 30 | 0.29 | 10 | 250 | 100 | 0 | 0 | 1 |
| 27 | C.E. B* | 30 | 0.43 | 15 | 500 | 100 | 1 | 1 | 1 |
| 28 | Ex. 2 | 10 | 0.33 | 8 | 30 | 28 | 0 | 0 | 0 |
| 29 | Ex. 2 | 10 | 0.28 | 10 | 40 | 22 | 0 | 0 | 0 |
| 30 | Ex. 2 | 10 | 0.27 | 15 | 90 | 30 | 0 | 1 | 0 |
| 31 | Ex. 2 | 20 | 0.33 | 8 | 90 | 30 | 0 | 0 | 1 |
| 32 | Ex. 2 | 20 | 0.40 | 10 | 90 | 31 | 0 | 1 | 0 |
| 33 | Ex. 2 | 20 | 0.36 | 15 | 90 | 28 | 0 | 1 | 0 |
| 34 | Ex. 2 | 30 | 0.27 | 8 | 150 | 34 | 0 | 1 | 0 |
| 35 | Ex. 2 | 30 | 0.27 | 10 | 200 | 43 | 0 | 1 | 1 |
| 36 | Ex. 2 | 30 | 0.26 | 15 | 200 | 31 | 0 | 0 | 0 |

*Not an example of the invention.

In addition to the data in Table II, sample no. 23 has a T-Peel Adhesion value of 0.1 kg/5 mm.

EXAMPLE 3

Phosphorylation of Advanced Epoxy Resin, EEW 900, with 1 phr $H_3PO_4$ (as 110% acid) in Ethylene Glycol Monobutyl Ether (50% Solids)

A solid bisphenol A based epoxy resin having an EEW of 900 available from The Dow Chemical Company as D.E.R. ™ 664 is phosphorylated by the procedure of Example 1. Coatings are prepared and tested as described in Example 1. The results are given in Table III.

COMPARATIVE EXPERIMENT C

The procedure of Comparative Experiment A is used to formulate, coat and test a composition with the solid epoxy resin having an EEW of 900 rather than the resin having an EEW of 1675. The results are given in Table III.

EXAMPLE 4

Phosphorylation of Advanced Aromatic-Aliphatic Hybrid Epoxy Resin, EEW 1839, with 1 phr $H_3PO_4$ (as 110% acid) in Ethylene Glycol Monobutyl Ether (50% Solids)

An advanced aromatic/aliphatic hybrid epoxy resin having an EEW of 1891, 95 grams, prepared from a blend of 50 wt. % bisphenol A based liquid epoxy resin having an EEW of 180 and 50 wt. % of an aromatic/aliphatic hybrid epoxy resin (diglycidyl ether of dipropoxylated bisphenol A having an EEW of 301) and bisphenol A in a ratio of phenolic hydroxyl equivalents per epoxide equivalent of 0.89:1 is mixed with 10.3 grams ethylene glycol monobutyl ether in a 3-neck 500 ml round bottom flask equipped with mechanical stirrer, condenser and temperature controller. The reactor is padded with nitrogen and heated to 125° C. A mixture of super phosphoric acid (0.95 gram, 1% based on resin solids) and ethylene glycol monobutyl ether (4.75 grams) is added all at once. The reaction mixture exotherms to 120° C. The reaction mixture is stirred and the temperature maintained for 30 minutes. Then deionized

TABLE III

| SAMPLE NO. | RESIN | % X-LINKER BTL 75108 | DRY FILM THICK. MILS | BAKE TIME | MEK DBL. RUBS | WEDGEBEND LOSS, mm | AUTOCLAVE BLUSH | AUTOCLAVE ADHESION | 20 INCH-LB REVERSE IMPACT |
|---|---|---|---|---|---|---|---|---|---|
| 37 | C.E. C* | 10 | 0.15 | 8 | 2 | 100 | 0 | 0 | 1 |
| 38 | C.E. C* | 10 | 0.21 | 10 | 2 | 100 | 0 | 0 | 1 |
| 39 | C.E. C* | 10 | 0.17 | 15 | 2 | 100 | 0 | 0 | 1 |
| 40 | C.E. C* | 20 | 0.18 | 8 | 2 | 35 | 0 | 0 | 1 |
| 41 | C.E. C* | 20 | 0.17 | 10 | 2 | 27 | 0 | 0 | 0 |
| 42 | C.E. C* | 20 | 0.18 | 15 | 2 | 42 | 0 | 0 | 0 |
| 43 | C.E. C* | 30 | 0.13 | 8 | 4 | 60 | 0 | 0 | 0 |
| 44 | C.E. C* | 30 | 0.15 | 10 | 4 | 26 | 0 | 0 | 1 |
| 45 | C.E. C* | 30 | 0.15 | 15 | 5 | 24 | 0 | 0 | 1 |
| 46 | Ex. 3 | 10 | 0.20 | 8 | 10 | 28 | 0 | 0 | 1 |
| 47 | Ex. 3 | 10 | 0.23 | 10 | 10 | 41 | 0 | 0 | 1 |
| 48 | Ex. 3 | 10 | 0.20 | 15 | 10 | 35 | 0 | 0 | 0 |
| 49 | Ex. 3 | 20 | 0.20 | 8 | 20 | 38 | 0 | 0 | 0 |
| 50 | Ex. 3 | 20 | 0.19 | 10 | 20 | 50 | 0 | 0 | 1 |
| 51 | Ex. 3 | 20 | 0.20 | 15 | 10 | 44 | 0 | 0 | 0 |
| 52 | Ex. 3 | 30 | 0.19 | 8 | 30 | 70 | 0 | 0 | 0 |
| 53 | Ex. 3 | 30 | 0.16 | 10 | 30 | 47 | 0 | 0 | 1 |
| 54 | Ex. 3 | 30 | 0.18 | 15 | 40 | 43 | 0 | 0 | 1 |

*Not an example of the invention.

water (1.9 grams) is added to hydrolyze the di- and triesters. The reaction mixture is stirred and heated for an additional 1 hour. Additional solvent (16 grams) is added to give a solid solution of the advanced hybrid epoxy resin phosphate ester (78% solids).

The resultant solution contains 50% solids with a Gardner viscosity of X+ (1400+ cps). This solution is diluted with DBE solvent (15 grams) to make a 45% solids solution with an application viscosity of Gardner R (480 cps).

The solvent borne formulation is coated on tin free steel using a drawdown bar to give a dry film thickness of 0.2 mils. The properties of the solvent borne hybrid phosphate ester are given in Table IV.

Note that the wedgebend test performance of the base resin is unexpectedly improved by making the phosphate ester solvent-borne derivative.

COMPARATIVE EXPERIMENT D

The procedure of Comparative Experiment A is used to formulate, coat and test the solid aromatic/aliphatic hybrid epoxy resin with EEW 1891. The results are given in Table IV.

TABLE IV

| SAM-PLE NO. | RESIN | % X-LINKER BTL 75108 | DRY FILM THICK. MILS | BAKE TIME | MEK DR | WEDGEBEND LOSS, mm | AUTOCLAVE BLUSH | AUTOCLAVE ADHESION | 20 INCH-LB REVERSE IMPACT |
|---|---|---|---|---|---|---|---|---|---|
| 55 | C.E. D* | 10 | 0.19 | 8 | 20 | 42 | 0 | 0 | 1 |
| 56 | C.E. D* | 10 | 0.30 | 10 | 20 | 31 | 0 | 0 | 0 |
| 57 | C.E. D* | 10 | 0.18 | 15 | 20 | 28 | 0 | 0 | 0 |
| 58 | C.E. D* | 20 | 0.21 | 8 | 40 | 43 | 0 | 0 | 1 |
| 59 | C.E. D* | 20 | 0.18 | 10 | 30 | 37 | 0 | 0 | 1 |
| 60 | C.E. D* | 20 | 0.23 | 15 | 30 | 29 | 0 | 0 | 0 |
| 61 | Ex. 4 | 10 | 0.22 | 8 | 20 | 24 | 0 | 0 | 0 |
| 62 | Ex. 4 | 10 | 0.22 | 10 | 10 | 30 | 0 | 0 | 0 |
| 63 | Ex. 4 | 10 | 0.21 | 15 | 20 | 25 | 0 | 0 | 0 |
| 64 | Ex. 4 | 20 | 0.20 | 8 | 40 | 22 | 0 | 0 | 0 |
| 65 | Ex. 4 | 20 | 0.25 | 10 | 60 | 25 | 0 | 1 | 1 |
| 66 | Ex. 4 | 20 | 0.21 | 15 | 60 | 20 | 0 | 0 | 1 |
| 67 | Ex. 4 | 30 | 0.19 | 8 | 60 | 37 | 0 | 0 | 0 |
| 68 | Ex. 4 | 30 | 0.23 | 10 | 120 | 30 | 0 | 0 | 0 |
| 69 | Ex. 4 | 30 | 0.23 | 15 | 180 | 29 | 0 | 0 | 1 |

*Not an example of the invention.

EXAMPLE 5

Phosphorylation of Advanced Epoxy Resin, EEW 1675, with 0.5 phr $H_3PO_4$ (as 110% acid) in Ethylene Glycol Monobutyl Ether (70% Solids)

The phosphorylation procedure used in Example 1 is followed except that the quantity of super phosphoric acid used is 0.5 grams, 0.027 mole). The above formulation is formulated as in Example 1 except that only the 20% crosslinker formulation is made. The above formulation is coated on TFS and tested as in Example 1. The results are given in Table V.

EXAMPLE 6

Phosphorylation of Advanced Epoxy Resin, EEW 1675, with 0.75 phr (as 110% acid) in Ethylene Glycol Monobutyl Ether (70% solids)

The procedure in Example 5 is used except that the quantity of super phosphoric acid used is 3.75 g (0.04 mole). The coating test results are given in Table V.

EXAMPLE 7

Phosphorylation of Advanced Epoxy Resin, EEW 1675, with 2.0 phr (as 110% super phosphoric acid) in Ethylene Glycol Monobutyl Ether The procedure in Example 5 is used except that the quantity of super phosphoric acid used is 10 g (0.1 mole). The coating test results are given in Table V.

TABLE V

| SAM-PLE NO. | RESIN | % X-LINKER BTL 75108 | DRY FILM THICK. MILS | BAKE TIME | MEK DR | WEDGEBEND LOSS, mm | AUTOCLAVE BLUSH | AUTOCLAVE ADHESION |
|---|---|---|---|---|---|---|---|---|
| 70 | Ex. 5 | 20 | 0.22 | 8 | 20 | 15 | 0 | 0 |
| 71 | Ex. 5 | 20 | 0.22 | 10 | 20 | 32 | 0 | 0 |
| 72 | Ex. 5 | 20 | 0.18 | 15 | 10 | 13 | 0 | 0 |
| 73 | Ex. 6 | 20 | 0.15 | 8 | 20 | 19 | 0 | 0 |
| 74 | Ex. 6 | 20 | 0.18 | 10 | 20 | 27 | 0 | 0 |
| 75 | Ex. 6 | 20 | 0.21 | 15 | 40 | 21 | 0 | 0 |
| 76 | Ex. 7 | 20 | 0.20 | 8 | 150 | 54 | 1.5 | 4 |
| 77 | Ex. 7 | 20 | 0.23 | 10 | 125 | 51 | 2 | 4 |
| 78 | Ex. 7 | 20 | 0.21 | 15 | 300+ | 60 | 1.5 | 4 |

*Not an example of the invention.

EXAMPLE 8

Phosphorylation of Advanced Aromatic-Hybrid Epoxy Resin, EEW 2000, with 1 phr $H_3PO_4$ (as 110% super phosphoric acid) in Ethylene Glycol Monobutyl Ether The procedure in Example 4 is followed using an aliphatic liquid epoxy resin (dipropylene glycol diglycidyl ether) having an of EEW 190 in place of the diglycidyl ether of dipropoxylated bisphenol A. The coating test results are given in Table VI.

COMPARATIVE EXPERIMENT E

The procedure of Comparative Experiment D is followed except that the un-phosphorylated resin from Example 8 is used. The coating test results are given in Table VI.

TABLE VI

| SAMPLE NO. | RESIN | % X-LINKER BTL 75108 | DRY FILM THICK. MILS | BAKE TIME | MEK DR | WEDGEBEND LOSS, mm | AUTOCLAVE BLUSH | AUTOCLAVE ADHESION | 20 INCH-LB REVERSE IMPACT |
|---|---|---|---|---|---|---|---|---|---|
| 79 | Ex. 8 | 10 | 0.19 | 8 | 10 | 19 | 0 | 0 | 0 |
| 80 | Ex. 8 | 10 | 0.28 | 10 | 20 | 26 | 1 | 0 | 0 |
| 81 | Ex. 8 | 10 | 0.26 | 15 | 10 | 25 | 0 | 0 | 1 |
| 82 | Ex. 8 | 20 | 0.26 | 8 | 70 | 26 | 1 | 0 | 0 |
| 83 | Ex. 8 | 20 | 0.2 | 10 | 70 | 25 | 1 | 0 | 0 |
| 84 | Ex. 8 | 20 | 0.24 | 15 | 90 | 35 | 0 | 0 | 0 |
| 85 | Ex. 8 | 30 | 0.18 | 8 | 70 | 38 | 0 | 0 | 0 |
| 86 | Ex. 8 | 30 | 0.23 | 10 | 100 | 42 | 0 | 0 | 0 |
| 87 | Ex. 8 | 30 | 0.15 | 15 | 110 | 25 | 0 | 0 | 1 |
| 88 | C.E. E* | 20 | 0.14 | 8 | 20 | 58 | 1 | 0 | 0 |
| 89 | C.E. E* | 20 | 0.17 | 10 | 40 | 47 | 0 | 0 | 0 |
| 90 | C.E. E* | 20 | 0.16 | 15 | 30 | 39 | 0 | 2 | 0 |
| 91 | C.E. E* | 30 | 0.18 | 8 | 50 | 35 | 0 | 0 | 0 |
| 92 | C.E. E* | 30 | 0.21 | 10 | 70 | 58 | 0 | 0 | 0 |
| 93 | C.E. E* | 30 | 0.17 | 15 | 90 | 53 | 0 | 0 | 0 |

*Not an example of the invention.

What is claimed is:

1. A curable composition which is (a) essentially water free and (b) polymer of ethylenically unsaturated monomer free; which comprises a mixture of
   (A) a product which is free of methylol or alkoxymethyl substituent groups resulting from reacting under phosphorylating conditions
      (1) at least one compound containing an average of more than one vicinal epoxide group per molecule selected from the group consisting of those epoxy resins represented by the following formulas I, II, III, IV or V

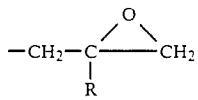

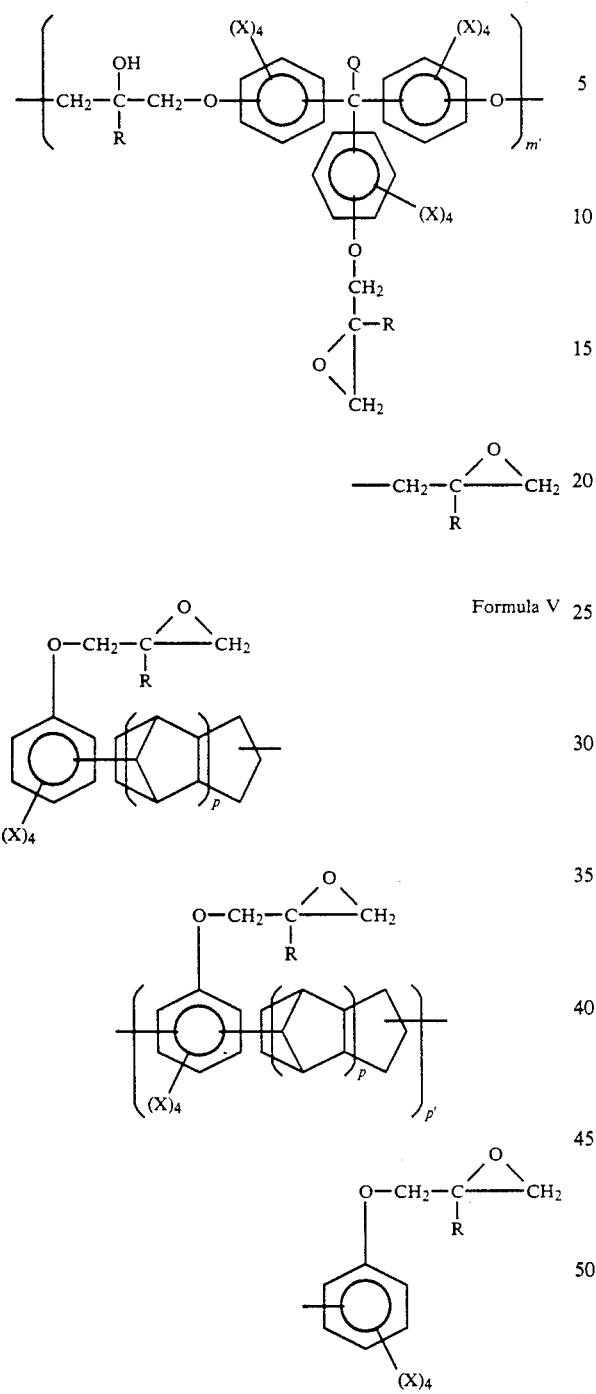

wherein each A is independently a divalent hydrocarbyl group having from 1 to about 12 carbon atoms; each A' is independently a divalent hydrocarbyl group having from 1 to about 10 carbon atoms; each Q is independently hydrogen or an alkyl group having from 1 to about 4 carbon atoms; each R is independently hydrogen or an alkyl group having from 1 to about 3 carbon atoms; each X is independently hydrogen, a hydrocarbyl or hydrocarbyloxy group having from 1 to about 12 carbon atoms or a halogen atom; m has a value from about 0.01 to about 8; n has a value of zero or 1; n' has an average value from about 0 to about 200; each p suitably has a value from zero to about 10; and each p' suitably has a value from zero to about 8; with (2) at least one member selected from the group consisting of
 (a) phosphoric acid;
 (b) super phosphoric acid; and
 (c) a combination of (a) and (b); and (3) optionally water; wherein component (2) is employed in an amount which provides a ratio of moles of component (2) to component (1) of from about 0.02:1 to about 5:1; and component (3) is employed in an amount which provides a ratio of moles of component (3) to moles of component (1) of from zero:1 to an amount sufficient to totally hydrolyze all of the epoxide groups in component (1), said amount of water including any amount of water contained in component (2) and subsequently removing any residual quantities of water remaining after any hydrolysis of the epoxide-containing compound of component (1); and (B) at least one organic solvent for component (A); and wherein component (A) is employed in an amount of from about 100 to about 10 percent by weight based upon the combined weight of components (A) and (B); and component (B) is employed in an amount of from about 0 to about 90 percent by weight based upon the combined weight of components (A) and (B); and (C) a curing quantity of at least one curing agent for component (A) which curing agent cures through the aliphatic hydroxyl groups contained in the phosphorylated and optionally totally or partially hydrolyzed epoxy resin.

2. An essentially water free composition of claim 1 wherein
 (a) component (2) is employed in an amount which provides a ratio of moles of component (2) to component (1) of from about 0.1:1 to about 2:1;
 (b) component (3) is employed in an amount which provides a ratio of moles of component (3) to moles of component (1) of from zero:1 to about 50:1;
 (c) component (A) is employed in an amount of from about 100 to about 10 percent by weight based upon the combined weight of components (A) and (B); and
 (d) component (B) is employed in an amount of from about 0 to about 90 percent by weight based upon the combined weight of components (A) and (B).

3. An essentially water free composition of claim 1 wherein
 (a) component (2) is employed in an amount which provides a ratio of moles of component (2) to component (1) of from about 0.2:1 to about 1:1;
 (b) component (3) is employed in an amount which provides a ratio of moles of component (3) to moles of component (1) of from zero:1 to about 20:1;
 (c) component (A) is employed in an amount of from about 80 to about 20 percent by weight based upon the combined weight of components (A) and (B); and
 (d) component (B) is employed in an amount of from about 20 to about 80 percent by weight based upon the combined weight of components (A) and (B).

4. An essentially water free composition of claim 1, 2 or 3 wherein component (B) is an alcohol, ketone, glycol, glycol ether, aromatic hydrocarbon of a combination thereof.

5. An essentially water free composition of claim 4 wherein
(a) said vicinal epoxide-containing compound, component (A1), is represented by formulas I-V wherein each A is independently a divalent hydrocarbyl group having from 1 to about 6 carbon atoms; each A' is independently a divalent hydrocarbyl group having from 1 to about 4 carbon atoms; each Q is hydrogen each R is independently hydrogen or an alkyl group having from 1 to about 3 carbon atoms; each X is independently hydrogen, a hydrocarbyl or hydrocarbyloxy group having from 1 to about 6 carbon atoms or chlorine or bromine; m has a value from about 1 to about 6; n' has an average value from about 0 to about 150; each p has a value from about 0 to about 8; and each p' has a value from about 1 to about 6;
(b) said organic solvent, component (B), is a glycol, glycol ether, aromatic hydrocarbon or a combination thereof.

6. An essentially water free composition of claim 5 wherein
(a) said vicinal epoxide-containing compound, component (1), is represented by formulas I-V wherein each A is independently a divalent hydrocarbyl group having from 1 to about 4 carbon atoms; each A' is independently a divalent hydrocarbyl group having from 1 to about 2 carbon atoms; each R is independently hydrogen or an alkyl group having from 1 to about 3 carbon atoms; each X is independently hydrogen, a hydrocarbyl or hydrocarbyloxy group having from 1 to about 4 carbon atoms or bromine; m has a value from about 2 to about 4; n has a value 1; n' has an average value from about 0 to about 100; each p has a value from about 0 to about 6; and each p' has a value from about 2 to about 4;
(b) said organic solvent, component (B), is a glycol ether, aromatic hydrocarbon or a combination thereof.

7. An essentially water free composition of claim 6 wherein
(a) said vicinal epoxide-containing compound, component (1), is a diglycidyl ether of bisphenol A, bisphenol F, bisphenol K, bisphenol S, or any combination thereof; and
(b) said organic solvent, component (B), is toluene, ethylene glycol monobutyl ether, ethylene glycol monohexyl ether, or any combination thereof.

8. An essentially water free curable composition of claim 1, 2 or 3 wherein said curing agent, component (C), is a polyisocyanate, blocked polyisocyanate, alkylolated urea-aldehyde resin, alkylolated melamine-aldehyde resin, alkylolated phenol-aldehyde resin, or any combination thereof.

9. An essentially water free curable composition of claim 1, 2 or 3 wherein said curing agent, component (C), is a methylolated urea-formaldehyde resin, methylolated melamine-formaldehyde resin, methylolated phenol-formaldehyde resin, or any combination thereof.

10. An essentially water free curable composition of claim 4 wherein said curing agent, component (C), is a polyisocyanate, blocked polyisocyanate, alkylolated urea-aldehyde resin, alkylolated melamine-aldehyde resin, alkylolated phenol-aldehyde resin, or any combination thereof.

11. A essentially water free curable composition of claim 10 wherein said curing agent, component (C), is a methylolated urea-formaldehyde resin, methylolated melamine-formaldehyde resin, methylolated phenol-formaldehyde resin, or any combination thereof.

12. An essentially water free curable composition of claim 5 wherein said curing agent, component (C), is a polyisocyanate, blocked polyisocyanate, alkylolated urea-aldehyde resin, alkylolated melamine-aldehyde resin, alkylolated phenol-aldehyde resin, or any combination thereof.

13. An essentially water free curable composition of claim 12 wherein said curing agent, component (C), is a methylolated urea-formaldehyde resin, methylolated melamine-formaldehyde resin, methylolated phenol-formaldehyde resin, or any combination thereof.

14. An essentially water free curable composition of claim 6 wherein said curing agent, component (C), is a polyisocyanate, blocked polyisocyanate, alkylolated urea-aldehyde resin, alkylolated melamine-aldehyde resin, alkylolated phenol-aldehyde resin, or any combination thereof.

15. A essentially water free curable composition of claim 14 wherein said curing agent, component (C), is a methylolated urea-formaldehyde resin, methylolated melamine-formaldehyde resin, methylolated phenol-formaldehyde resin, or any combination thereof.

16. An essentially water free curable composition of claim 7 wherein said curing agent, component (C), is a polyisocyanate, blocked polyisocyanate, alkylolated urea-aldehyde resin, alkylolated melamine-aldehyde resin, alkylolated phenol-aldehyde resin, or any combination thereof.

17. An essentially water free curable composition of claim 16 wherein said curing agent, component (C), is a methylolated urea-formaldehyde resin, methylolated melamine-formaldehyde resin, methylolated phenol-formaldehyde resin, or any combination thereof.

18. An article coated with an essentially water free curable composition of claim 1, 2 or 3 which composition has subsequently been cured.

19. An article coated with an essentially water free curable composition of claim 4 which composition has subsequently been cured.

20. An article coated with an essentially water free curable composition of claim 5 which composition has subsequently been cured.

21. An article coated with an essentially water free curable composition of claim 6 which composition has subsequently been cured.

22. An article coated with an essentially water free curable composition of claim 7 which composition has subsequently been cured.

23. An article coated with an essentially water free curable composition of claim 8 which composition has subsequently been cured.

24. An article coated with an essentially water free curable composition of claim 9 which composition has subsequently been cured.

25. An article coated with an essentially water free curable composition of claim 10 which composition has subsequently been cured.

26. An article coated with an essentially water free curable composition of claim 11 which composition has subsequently been cured.

27. An article coated with an essentially water free curable composition of claim 12 which composition has subsequently been cured.

28. An article coated with an essentially water free curable composition of claim 13 which composition has subsequently been cured.

29. An article coated with an essentially water free curable composition of claim 14 which composition has subsequently been cured.

30. An article coated with an essentially water free curable composition of claim 15 which composition has subsequently been cured.

31. An article coated with an essentially water free curable composition of claim 16 which composition has subsequently been cured.

32. An article coated with an essentially water free curable composition of claim 17 which composition has subsequently been cured.

* * * * *